(12) United States Patent
Tillotson

(10) Patent No.: US 10,006,407 B1
(45) Date of Patent: Jun. 26, 2018

(54) OPTICAL HEAT EXCHANGER AND ASSOCIATED METHOD

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1096 days.

(21) Appl. No.: 13/481,204

(22) Filed: May 25, 2012

(51) Int. Cl.
| | | |
|---|---|---|
| *B64G 1/40* | (2006.01) | |
| *B64G 1/00* | (2006.01) | |
| *F24J 2/08* | (2006.01) | |
| *F24J 2/00* | (2014.01) | |
| *F02K 7/08* | (2006.01) | |

(52) U.S. Cl.
CPC .............. *F02K 7/08* (2013.01); *B64G 1/401* (2013.01); *F24J 2/08* (2013.01); *B64G 1/409* (2013.01)

(58) Field of Classification Search
CPC ........ B64G 1/401; B64G 1/402; B64G 1/408; B64G 1/409; B64G 1/40; B64G 1/44; F03H 1/00; F01K 15/00; F01K 27/00; Y02T 50/671; F02K 7/00; F02K 7/08; F24J 2/08; F24J 2/0015
USPC ........... 165/44; 219/618, 628–629, 200–203; 60/200.1, 203.1, 204–207, 267; 432/29–30; 244/171.1, 171.3–171.4, 244/172.7–172.8, 15
See application file for complete search history.

(56) References Cited

U.S. PATENT DOCUMENTS

| | | | | |
|---|---|---|---|---|
| 3,083,528 A | * | 4/1963 | Brown ......................... | 60/203.1 |
| 4,716,275 A | * | 12/1987 | Waldschmidt .......... | F25D 21/08 219/201 |
| 5,159,586 A | * | 10/1992 | Yamashita et al. ........ | 369/44.11 |
| 5,977,478 A | * | 11/1999 | Hibino ........................ | F24J 2/06 126/684 |
| 6,087,579 A | * | 7/2000 | Muskatevc ........... | H01L 31/048 136/246 |
| 6,421,998 B1 | * | 7/2002 | Frye ....................... | B64G 1/401 60/203.1 |
| 6,993,898 B2 | * | 2/2006 | Parkin ......................... | 60/203.1 |

(Continued)

FOREIGN PATENT DOCUMENTS

WO WO 2011001151 A2 * 1/2011 ............... F24J 2/067

OTHER PUBLICATIONS

NPL to DNP-Screens.*

(Continued)

*Primary Examiner* — Michael Hoang
(74) *Attorney, Agent, or Firm* — Alston & Bird LLP

(57) ABSTRACT

An optical heat exchanger and an associated system and method are provided to allow a vehicle, such as an unmanned air vehicle, a rocket or the like, to deliver more payload at a lower cost. The optical heat exchanger includes a support surface defining a plurality of tapered openings. Each tapered opening tapers from the first size proximate an outwardly facing end of the opening to a second smaller size proximate an inwardly facing end of the opening. The inwardly facing end of each tapered opening is in communication with the propellant. The optical heat exchanger also includes a plurality of lenses with each lens positioned proximate the outwardly facing end of a respective opening. Each lens is configured to receive an electromagnetic energy beam and concentrate the majority of the electromagnetic energy beam through the inwardly facing end of the respective tapered opening, thereby heating the propellant.

16 Claims, 4 Drawing Sheets

(56) References Cited

U.S. PATENT DOCUMENTS

2005/0128428 A1* 6/2005 Hamaker ............... G02C 9/00
351/57
2013/0167832 A1* 7/2013 Kim ............................ 126/600

OTHER PUBLICATIONS

WayBack for NPL.*
File: Laser launch hx kare.png; From Wikipedia, the free encyclopedia; [Online]; [Retrieved on May 25, 2012]; Retrieved from the Internet <URL: http://en.wikipedia.org/wiki/File:Laser_launch_hx_kare.png; 2 pages.

"How beam-powered launch works"; Powerpoint presentation prepared by Engineering, Operations & Technology; Boeing Research & Technology; © 2011 Boeing; 9 pages.
Laser propulsion; From Wikipedia, the free encyclopedia; [Online]; [Retrieved on May 25, 2012]; Retrieved from the Internet <URL: http://en.wikipedia.org/wiki/Laser_propulsion#Heat_Exchanger_.28HX.29_Thruster; 4 pages.
NASA Shoting Star 3D lens; [Online]; [Retrieved on May 25, 2012]; Retrieved from the Internet <URL:http://www.cleanmpg.com/photos/data/501/Xerox_PARC_Solar_Collector.jpg; 1 page.

* cited by examiner

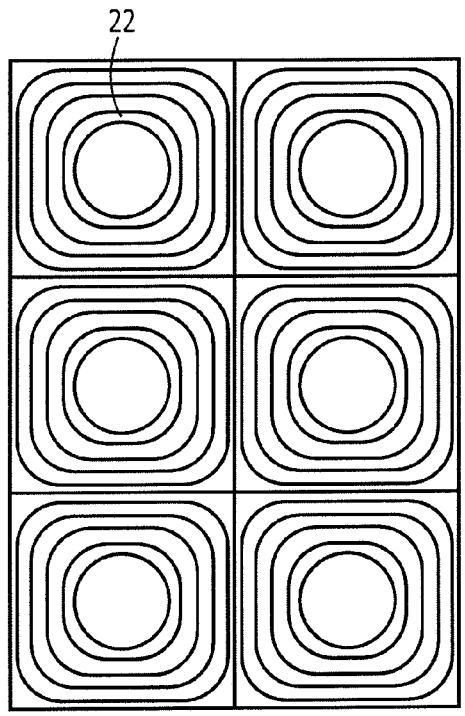
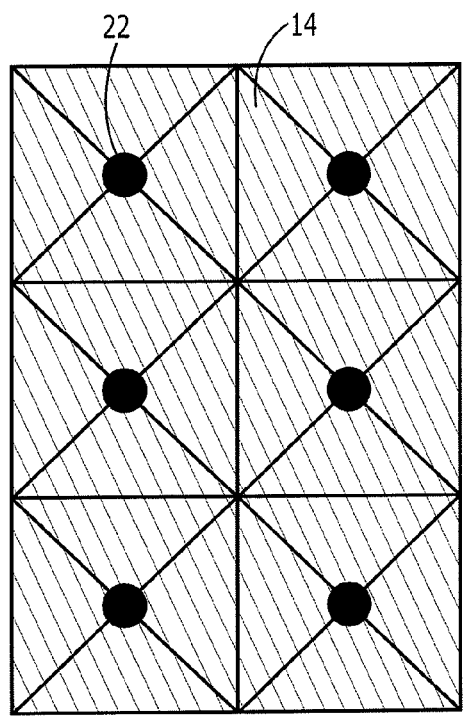
Figure 3  Figure 4
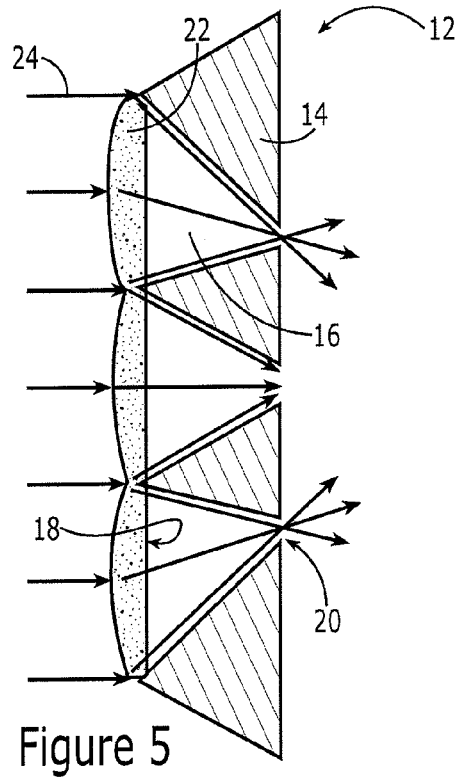
Figure 5

OPTICAL HEAT EXCHANGER AND ASSOCIATED METHOD

TECHNOLOGICAL FIELD

Embodiments of the present disclosure relate generally to an optical heat exchanger and an associated method and, more particularly, to an optical heat exchanger and an associated method for heating a propellant carried by a vehicle.

BACKGROUND

Most modern spacecraft or aircraft rely upon chemical propulsion. Chemical propulsion typically requires fuel and an oxidizer to be burnt to produce both energy and a reaction mass. Various engine designs have been utilized in order to convert the energy and reaction mass into thrust which propels the spacecraft or aircraft. However, the performance of these engine designs is limited by the energy of the chemical reactions and by the molecular mass of the reaction products, such as $H_2O$ and $CO_2$.

As a result of the limitations upon the performance of these various engine designs, alternative approaches have been developed. Some alternative approaches have utilized an external energy source, such as a beam of electromagnetic energy. By relying upon an external energy source, these alternative approaches have eliminated the need for combustion such that the propellant may be chosen to have a relatively low molecular mass, therefor creating a relatively high exhaust speed for a given temperature. Since the materials from which an engine is constructed are limited by the peak temperature at which the engine operates, the reliance upon a beam of electromagnetic energy as a source of external energy allows higher exhaust speeds and, therefore, a higher specific impulse than engines that rely upon chemical propulsion.

One approach that utilizes an external energy source is a heat exchanger laser thruster. A heat exchanger laser thruster includes a set of tubes arranged on a flat plate upon which the beam of electromagnetic energy, such as a laser beam, impinges. Each tube carries a fraction of the propellant that flows from a tank into a nozzle of the engine. The outer surfaces of the tubes absorb the electromagnetic energy as heat. The heat flows through the wall of the tubes and into the propellant. The tubes may be formed of an opaque material, such as metal, that carries a relatively high heat flux from the outer surfaces at which the tubes absorb the electromagnetic energy to the inner surfaces that are in contact with the propellant.

As such, the heat exchanger laser thruster operates as a second surface heat exchanger. A second surface heat exchanger may impose conflicting requirements with respect to the material from which the tubes are constructed. In this regard, the material from which the tubes are constructed is heated during operation to be as hot as possible so that it can, in turn, heat the propellant to be as hot as possible. Additionally, the material from which the tubes are formed is desirably thin so as to reduce the temperature difference between the surface of the tubes upon which the beam of electromagnetic energy impinges and the propellant. These requirements for both thinness and operability at high temperatures may be in conflict with the requirement to contain the propellant under high pressure. In this regard, the propellant is required to be maintained under high pressure in order to achieve a desired thrust-to-weight ratio for the engine. Additionally, the requirement for the material from which the tubes are constructed to have a high strength at high temperatures may conflict with a need for the material from which the tubes are constructed to conduct a relatively large heat flux. For example, titanium may have relatively good strength at a high temperature, but does not conduct heat as well as aluminum.

In another example, a spacecraft or aircraft, such as a rocket or a jet engine, may include a windowed heat exchanger. In this regard, a beam of electromagnetic energy, such as a laser beam, may pass through a window and enter the engine. The window may be a single large plate of transparent material attached to an opaque structure. Once the electromagnetic energy has passed through the window, the electromagnetic energy may be either directly absorbed by the propellant or may impinge upon a surface that, in turn, is in direct contact with the propellant. The window of a windowed heat exchanger therefore both admits the electromagnetic energy and confines the propellant.

As a result of the containment of the working fluid by the single large plate of transparent material that serves as the window in a windowed heat exchanger, the thickness of the window increases with its width for a given pressure. Additionally, transparent materials that may otherwise be suitable for the windowed heat exchanger are rarely as stiff as standard structural materials such that the windowed heat exchanger having a relatively wide window may require a thick and, therefore, quite heavy, plate of transparent material.

Therefore, there is a need for improved optical heat exchangers that permit more payload to be delivered at a lower cost. In this regard, there is a need for an improved optical heat exchanger to allow the thrust-to-weight ratio of the engine of a vehicle to be enhanced in order to address at least some of the foregoing deficiencies.

BRIEF SUMMARY

An optical heat exchanger and an associated system and method are provided according to an example embodiment of the present disclosure in order to allow a vehicle, such as an unmanned air vehicle (UAV), a rocket or the like, to deliver more payload at a lower cost, such as by improving the thrust-to-weight ratio of the engine of the vehicle. In one embodiment, the optical heat exchanger and the associated system and method may provide for energy, such as electromagnetic energy, to be transferred into the propellant which has a lower mass and a higher exhaust speed than many heat exchanger laser thrusters and/or windowed heat exchangers.

In one embodiment, an optical heat exchanger is provided for heating a propellant carried by a vehicle. The optical heat exchanger includes a support surface defining a plurality of tapered openings. Each tapered opening tapers from the first size proximate an outwardly facing end of the opening to a second size, smaller than the first size, proximate an inwardly facing end of the opening. The inwardly facing end of each tapered opening is in communication with the propellant. The optical heat exchanger of this embodiment also includes a plurality of lenses with each lens positioned proximate the outwardly facing end of a respective opening. Each lens is configured to receive an electromagnetic energy beam and concentrate the majority of the electromagnetic energy beam through the inwardly facing end of the respective tapered opening so as to heat the propellant.

Each lens may have at least one dimension that is smaller than the width of the electromagnetic light beam. Adjacent lenses of one embodiment may abut one another. The lenses may include convex lenses having a focal length that causes the electromagnetic energy beam to be focused through the inwardly facing ends of the respective tapered openings. The plurality of lenses may include rectangular lenses and the support structure may correspondingly define a plurality of frustopyramical openings.

The optical heat exchanger of one embodiment may also include an absorber surface in communication with the inwardly facing end of each tapered opening and configured to absorb at least a portion of the electromagnetic energy beam. The absorber surface may also be configured to be in contact with the propellant. The optical heat exchanger of one embodiment may also include a window plug positioned between the inwardly facing end of the opening and the propellant. Additionally or alternatively, the optical heat exchanger of one embodiment may also include an interior lens positioned between the inwardly facing end of the opening and the propellant.

The support structure of one embodiment may include a plurality of double tapered structural elements which define a plurality of double tapered openings. The support structure of one embodiment may also include a reflective coating configured to reflect the electromagnetic energy beam. The support structure of one embodiment may also define a duct extending therethrough and configured to permit coolant to pass therealong. At least one of the plurality of lenses of the optical heat exchanger may include an off-axis lens. In this embodiment, the inwardly facing end of the tapered opening with which the off-axis lens is associated may be off-axis relative to the outwardly facing end of the tapered opening.

In another embodiment, a system for heating a propellant is provided that includes a vehicle, such as an unmanned air vehicle or a rocket, carrying the propellant and an optical heat exchanger carried by the vehicle. The optical heat exchanger of this embodiment includes a support structure defining a plurality of tapered openings with each of the tapered openings tapering from a first size proximate the outwardly facing end of the opening to a second size, smaller than the first size, proximate the inwardly facing end of the opening. The optical heat exchanger of this embodiment also includes a plurality of lenses with each lens positioned proximate the outwardly facing end of a respective tapered opening. Each lens may be configured to receive an electromagnetic energy beam and to concentrate the majority of the electromagnetic energy beam through the inwardly facing end of the respective tapered opening so as to heat the propellant.

The lenses may include convex lenses having a focal length that causes the electromagnetic energy beam to be focused through the inwardly facing ends of the respective tapered openings. This system of one embodiment may also include an absorber surface in communication with the inwardly facing end of each tapered opening and configured to absorb at least a portion of the electromagnetic energy beam. The absorber surface of this embodiment may also be configured to be in contact with the propellant.

In a further embodiment, a method of manufacturing an optical heat exchanger carried by a vehicle is provided. In this embodiment, the method includes defining a plurality of tapered openings with a support structure that is carried by the vehicle. Each tapered opening tapers from a first size proximate an outwardly facing end of the opening to a second size, smaller than the first size, proximate an inwardly facing end of the opening. The inwardly facing end of each tapered opening is in communication with a propellant carried by the vehicle. The method of this embodiment also positions a plurality of lenses proximate the outwardly facing ends of respective tapered openings. Each lens is configured to receive an electromagnetic energy beam and to concentrate a majority of the electromagnetic energy beam through the inwardly facing ends of the respective tapered openings to heat the propellant.

In regards to positioning the plurality of lenses, the plurality of lenses may be positioned so as to abut one another. The method of one embodiment may also include positioning an absorber surface in communication with the inwardly facing end of each tapered opening so as to absorb at least a portion of the electromagnetic energy beam. The absorber surface of this embodiment may also be positioned so as to be in contact with the propellant.

The features, functions, and advantages that have been discussed can be achieved independently in various embodiments or may be combined in yet other embodiments; further details of which can be seen with reference to the following description and drawings.

BRIEF DESCRIPTION OF DRAWINGS

Figures 1, 2:
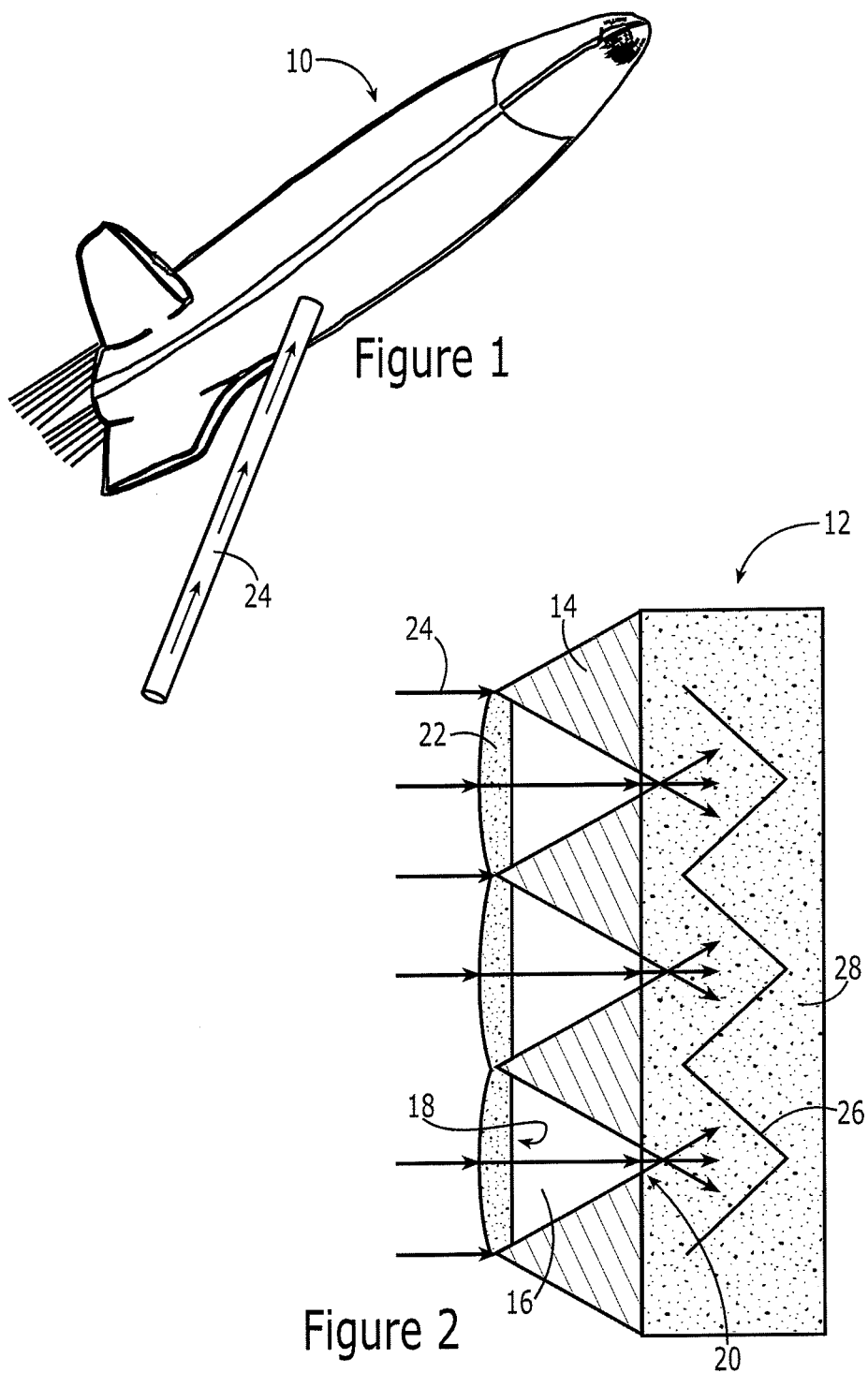
Figure 6:
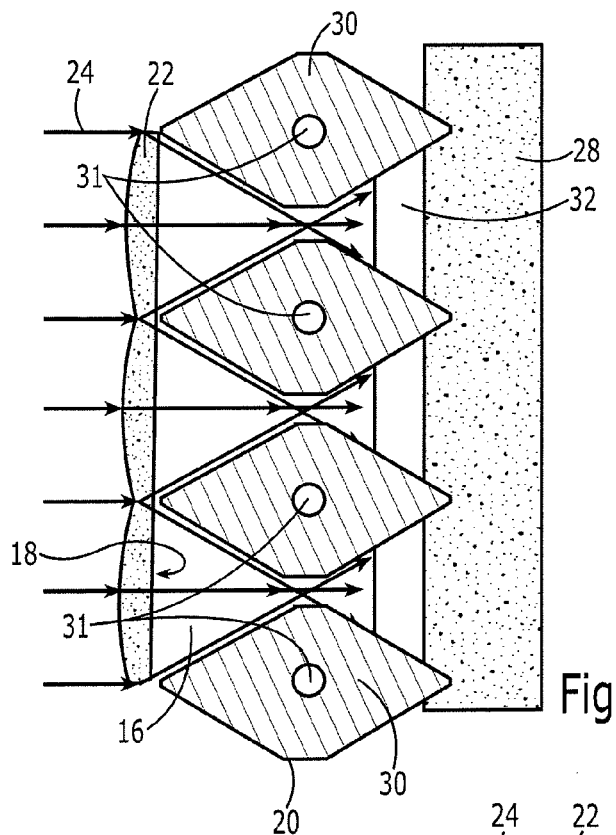
Figure 7:
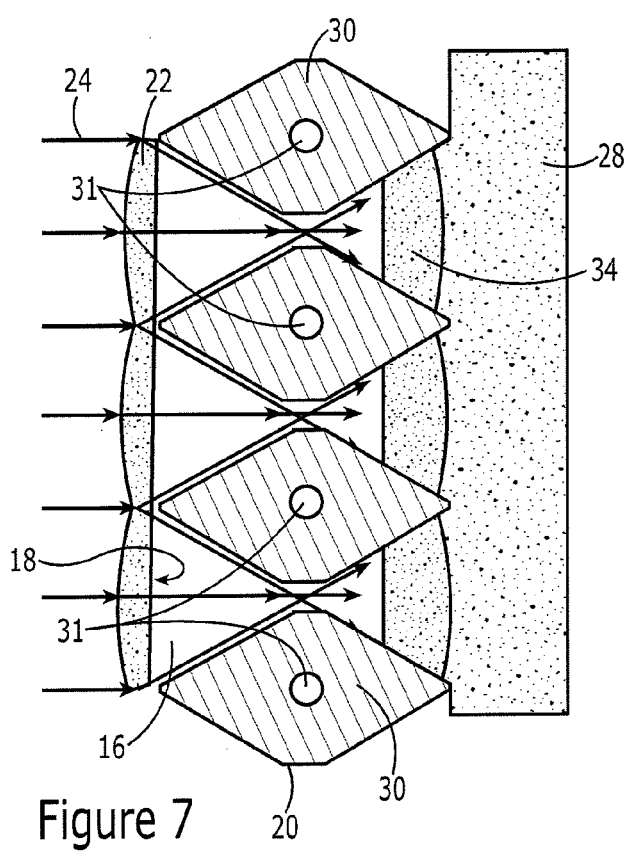
Figure 8:
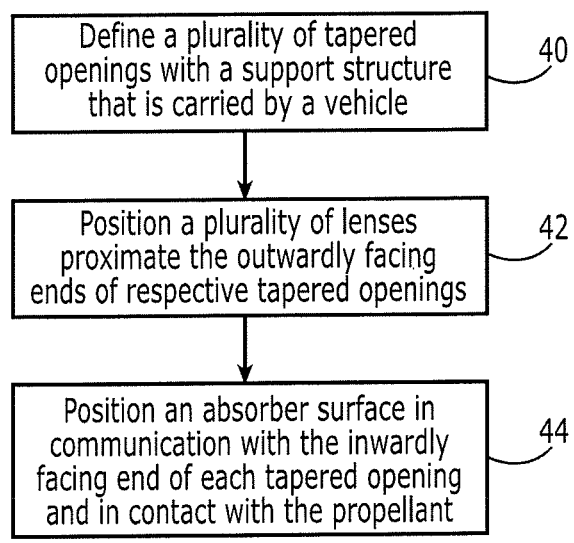

Having thus described certain embodiments of the present disclosure in general terms, reference will now be made to the accompanying drawings, which are not necessarily drawn to scale, and wherein:

FIG. 1 is a perspective view of a vehicle that may carry an optical heat exchanger in accordance with an example embodiment of the present disclosure;

FIG. 2 is a side view of an optical heat exchanger of one embodiment of the present disclosure;

FIG. 3 is a plan view of a plurality of lenses of an optical heat exchanger in accordance with one embodiment of the present disclosure;

FIG. 4 is a plan view of a support structure of an optical heat exchanger in accordance with an example embodiment of the present disclosure;

FIG. 5 is a side view of an optical heat exchanger in accordance with another embodiment of the present disclosure;

FIG. 6 is a side view of an optical heat exchanger in accordance with a further embodiment of the present disclosure;

FIG. 7 is a side view of an optical heat exchanger in accordance with a yet another embodiment of the present disclosure;

FIG. 8 is a flowchart illustrating the operations performed in accordance with one embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, a vehicle 10 that carries an optical heat exchanger that may rely upon an external energy source, such as a beam of electromagnetic energy, e.g., a laser beam or a beam formed of concentrated sunlight, to deliver energy to the propellant carried by the vehicle in order to propel the vehicle is illustrated. Various types of vehicles 10 may carry an optical heat exchanger in accordance with example embodiments of the present disclosure, but the optical heat exchanger will be hereinafter described in conjunction with a spacecraft or an aircraft, such as an unmanned air vehicle (UAV), a rocket or the like. By relying upon an external energy source and eliminating the need for combustion, the propellant may be chosen to have a lower molecular mass and may therefore have a higher exhaust speed and a correspondingly higher specific impulse for a given temperature than achieved by chemical propulsion systems. Various types of propellants may be utilized including, for example, hydrogen or helium.

The vehicle 10 may not only carry the propellant, but may also carry an optical heat exchanger for receiving the electromagnetic energy beam and for delivering the electromagnetic energy to the propellant carried by the vehicle. An optical heat exchanger 12 of one embodiment is illustrated in FIG. 2. As shown, the optical heat exchanger 12 includes a support structure 14 defining a plurality of tapered openings 16. Each tapered opening 16 tapers from a first size proximate an outwardly facing end 18 of the opening to a second size, smaller than the first size, proximate an inwardly facing end 20 of the opening. The outwardly facing ends 18 of the openings 16 defined by the support structure 14 may be positioned proximate an outer surface of the vehicle 10 or may at least be outwardly facing relative to the vehicle. In contrast, the inwardly facing ends 20 of the openings 16 defined by this support structure 14 may face the interior of the vehicle and, in one embodiment, may be in communication with the propellant. In this regard, the inwardly facing ends 20 of the tapered openings 16 defined by the support structure 14 may be in direct communication with the propellant or may otherwise be in communication with the propellant such that the electromagnetic energy that is presented to the inwardly facing ends of the tapered openings of the support structure is delivered to the propellant.

The support structure 14 may be formed of various materials, but in one embodiment is formed of tungsten. Additionally, the support structure 14 of one embodiment may include a reflective coating configured to reflect the electromagnetic energy beam. While the support structure of this embodiment may include various types of reflective coatings that are configured to be at least partially reflective with respect to the electromagnetic energy beam, the reflective coating of one embodiment in which the electromagnetic energy beam is comprised of near-infrared energy may be formed of gold.

As shown in FIG. 2, the optical heat exchanger 12 also includes a plurality of lenses 22. Each lens is positioned proximate the outwardly facing end 18 of a respective tapered opening 16 and, in one embodiment, is seated within or otherwise coincident with the outwardly facing end of a respective tapered opening. In this regard, the radial edges of each lens 22 may be tapered at the same angle at which the sidewalls of the tapered openings 16 are disposed such that each lens may be seated within the outwardly facing end 18 of a respective tapered opening as shown, for example, in FIG. 2. The lenses 22 may be secured to the support structure 14 in various manners, but, in one embodiment, are secured to the support structure with an adhesive.

Each lens 22 is configured to receive the electromagnetic energy beam 24 and to concentrate a majority, if not all, of the electromagnetic energy beam that is received by the respective lens through the inwardly facing end 20 of the respective tapered opening 16. In one embodiment, each lens 22 is a convex lens having a focal length that causes the electromagnetic energy beam 24 to be focused through the inwardly facing end 20 of the respective tapered opening 16. As such, each convex lens 22 may focus the electromagnetic energy beam 24 through the inwardly facing end 20 of the respective tapered opening 16 such that the electromagnetic energy beam does not contact the side surfaces of the support structure 14 that defines the respective tapered opening.

The lenses 22 may be formed of a material that is transparent to the wavelength of the electromagnetic energy beam 24 such that the electromagnetic energy beam passes therethrough and is correspondingly redirected by the lenses. For example, in an embodiment in which the electromagnetic energy beam is comprised of near-infrared energy, the lenses 22 may be formed of quartz. In one embodiment, each lens 22 has at least one dimension, such as a width, that is smaller, such as by being substantially smaller, than the width of the electromagnetic energy beam 24. The lenses 22 may be sized such that adjacent lenses abut one another along their radial edges. As such, the optical heat exchanger 12 may include a plurality of lenses 22 that are positioned adjacent to one another such that the entire surface of the optical heat exchanger that faces outwardly away from the vehicle 10 is tiled by the lenses, such as by being 100% covered by the lenses. Thus, the optical heat exchanger 12 of this embodiment may receive all of the electromagnetic energy that impinges upon the optical heat exchanger. However, the use of a plurality of lenses 22 supported by the support structure 14 increases the strength and the stiffness provided by the combination of the lenses and the support structure relative to the strength and stiffness of a single large lens of the same size as the plurality of lenses, thereby allowing the lenses to be made thinner in some embodiments so as to reduce the weight of the optical heat exchanger without compromising and, in some embodiments, while improving its strength and stiffness. In this regard, the support of the lenses 22 by a support structure 14 that has a relatively wide opening proximate a lens, but that covers a large fraction of the cross-sectional area at a depth relative to the lens that corresponds to the inwardly facing end 20 of the tapered opening 16 provides substantial strength and stiffness to the lenses.

Referring now to FIG. 3, a plurality of lenses 22 of an optical heat exchanger 12 are illustrated. While six lenses 22 arranged in a 3×2 array is illustrated, an optical heat exchanger 12 may include any number of lenses. As shown, the plurality of the lenses 22 are positioned so as to abut one another with each lens being associated with a respective tapered opening 16 and being positioned proximate an outwardly facing end 18 of the respective tapered opening. Similarly, FIG. 4 illustrates a support structure 14 when viewed from the inwardly facing end 20 of the tapered openings 16. Similar to the lenses 22 of the embodiment of FIG. 3, the support structure 14 of the embodiment of FIG. 4 includes six tapered openings 16 arranged in a 3×2 array, although the support structure of other embodiments may define any number of tapered openings. The plurality of lenses 22 may be individual, discrete lenses or the plurality of lenses may be an integrated array.

The lenses 22 may have various shapes and the support structure 14 may define correspondingly shaped tapered openings 16, each having an outwardly facing end 18 that generally matches the lens in shape and size. In the embodiment illustrated in FIGS. 3 and 4, the plurality of lenses 22 include a plurality of rectangular lenses, such as a plurality of square lenses. Correspondingly, the support structure 14 defines tapered openings 16 having an outwardly facing end 18 having a rectangular, e.g., square, shape that is sized to match the respective lens 22. In the embodiment in which the plurality of lenses 22 are rectangular lenses, the tapered openings 16 defined by the support structure 14 may be frustopyramidal. However, the lenses 22 and the corresponding tapered openings 16 defined by the support structure 14 may have other shapes in other embodiments. For example, in an instance in which the receiver of the electromagnetic energy beam is aligned to the vehicle's linear axis, the lenses 22 may be relatively long rectangular lenses, e.g., linear lenses, and the support structure 14 may, in turn, define a plurality of tapered openings 16 that are correspondingly relatively long and rectangular and that taper inwardly from an outwardly facing end 18 that is sized and shaped to correspond to the relatively long rectangular lenses to an inwardly facing end 20 in the form, for example, of a long slit. As such, the vehicle 10 of this embodiment may tilt to a significant degree with respect to the source of the electromagnetic energy, while still receiving at least a portion of the electromagnetic energy.

As shown in FIG. 2, the optical heat exchanger 12 may also include an absorber surface 26 that is inboard of the support structure 14 and is configured to receive the electromagnetic energy that passes through the inwardly facing ends 20 of the tapered openings 16 defined by the support structure. As such, the absorber surface 26 is in communication with the inwardly facing ends 20 of the tapered openings 16 defined by the support structure 14. The absorber surface 26 serves as a heat transfer surface so as to absorb at least a portion of the electromagnetic energy provided by the electromagnetic energy beam 24. In one embodiment, for example, the absorber surface may be formed of silicon carbide. As also shown in FIG. 2, the propellant 28 or other working fluid is in contact with the absorber surface 26, with the absorber surface of one embodiment being immersed within the propellant as the propellant flows from a storage tank to an input nozzle into the engine. In one embodiment, the propellant 28 may be configured to flow in a predetermined direction. As such, the absorber surface 26 of this embodiment may include a plurality of corrugations that extend in or parallel to the predetermined direction in which the propellant 28 is configured to flow. In the illustrated embodiment of FIG. 2, for example, the plurality of corrugations defined by the absorber surface 26 permit the propellant 28 to flow into and out of the page. As such, the electromagnetic energy beam 24 that passes through the inwardly facing ends 20 of the tapered openings 16 defined by the support structure 14 heats the propellant 28, both directly via impingement of the electromagnetic energy upon the propellant and more indirectly via the absorber surface 26 that is heated by the electromagnetic energy and which, in turn, further heats the propellant that is in communication therewith.

The absorber surface 26 may therefore serve as a first surface heat exchanger in which the surface that absorbs the energy is also the surface in contact with the propellant 28 or other working fluid. By utilizing direct absorption or a first surface heat exchanger in regards to the heating of the propellant 28, the propellant may reach a higher temperature and a higher pressure, thereby enabling a greater specific impulse and a greater thrust-to-weight ratio.

In one embodiment, such as illustrated in FIG. 2, the focal point of each lens 22 is aligned in an axial direction with the center axis of the tapered opening 16 and the center point of both the outwardly facing end 18 and the inwardly facing end 20 of the tapered opening. In other embodiments, however, one or more of the lenses 22 may be an off-axis lens that is configured to focus the electromagnetic energy beam 24 to a point offset from the center axis of the lens. As shown in FIG. 5, for example, the centermost lens may be configured to focus the electromagnetic energy beam 24 on axis, but the other lenses that are offset from the center of the lens array may be off-axis lenses that are configured to focus the electromagnetic energy beam at a point that is offset from the center axis of the lens. In this regard, the off-axis lenses may be configured to focus the electromagnetic energy beam to a common point interior of the support structure. In order to accommodate the off-axis lenses, the support structure 14 of this embodiment may be configured such that the tapered openings 16 that receive and are associated with an off-axis lens are shaped so as to have a correspondingly off-axis shape with the inwardly facing end 20 of the tapered opening being off-axis relative to the outwardly facing end 18 of the tapered opening. By utilizing one or more off-axis lenses, the electromagnetic energy beam 24 may be directed to a different region interior of the support structure 14, such as by being directed toward the center of the overall electromagnetic energy beam as opposed to being more evenly spread across the width of the electromagnetic energy beam. In another example, a plurality of off-axis lenses may be configured to smooth or to otherwise change the intensity profile of the electromagnetic energy beam 24.

In order to provide additional structural support and therefore to provide additional strength and stiffness to the plurality of lenses 22, the support structure 14 may have an increased thickness and, in one embodiment, the support structure may include a plurality of double-tapered structural elements 30 which define a plurality of double-tapered openings as shown, for example, in FIG. 6. In the illustrated embodiment, the double-tapered opening initially tapers inwardly from the outwardly facing end 18 to the inwardly facing end 20 and then tapers outwardly again in a direction toward the interior of the vehicle 10. Regardless of the type of structural elements 30 of the support structure, the support structure may define one or more ducts 31 through the structural elements. By circulating a coolant, such as supercritical hydrogen, through the ducts 31, the support structure 14 may be cooled during operation.

In some embodiments, it may be desirable to prevent contact between the propellant 28 or other working fluid and the plurality of lenses 22 so as to prevent the propellant or other working fluid from exerting pressure on the plurality of lenses. As such, the optical heat exchanger 12 of one embodiment may include a plurality of window plugs 32, one of which is positioned between the inwardly facing end 20 of each tapered opening 16 and the propellant 28 or other working fluid as also shown in FIG. 6. The window plug 32 may be sized and shaped to fill the opening defined by the support structure 14, thereby preventing the propellant 28 or other working fluid from entering the tapered opening 16 and exerting pressure upon the lens 22. In one embodiment, the radial edges of the window plug 32 may be tapered and the portion of the support structure 14 within which the window plug is seated may be correspondingly tapered in such a manner that the pressure exerted by the propellant 28 or other working fluid upon the window plug urges the window plug into engagement with the support structure. Thus, the stability of the window plug 32 need not be dependent upon the tensile strength of an adhesive that may secure the window plug to the support structure 14, but, instead, the window plug is pressed into operable contact with the support structure by the propellant 28 or other working fluid. The window plug 32 is advantageously transparent to the wavelength of the electromagnetic energy beam 24 such that the electromagnetic energy beam passes therethrough without loss or redirection.

While the window plug 32 may allow the electromagnetic energy beam 24 to pass therethrough without redirection, the optical heat exchanger 12 of other embodiments may include a plurality of interior lenses 34 that serves to redirect, such as by collimating, the electromagnetic energy following its passage through the tapered opening 16 and exit from the inwardly facing end 20 of the tapered opening. In this embodiment, as shown in FIG. 7, an interior lens 34 may be positioned between the inwardly facing end 20 of each respective tapered opening 16 and the propellant 28 or other working fluid. As described above in conjunction with the window plug 32, the radial edges of the interior lens 34 may be tapered and the portion of the support structure 14 with which the second lens makes operable contact may be correspondingly tapered such that the pressure exerted by the propellant 28 or other working fluid upon the interior lens effectively forces the interior lens into more secure contact with the support structure and prevents the propellant or other working fluid from entering the tapered opening 16 and contacting the lens 22. The interior lens 34 may also be secured to the support structure 14 by an adhesive.

The optical heat exchanger 12 may therefore efficiently transfer the energy conveyed by electromagnetic energy beam 24 to the propellant 28 or other working fluid so as to facilitate operation of the engine. However, the optical heat exchanger 12 is configured to receive the electromagnetic energy beam 24 and to direct the electromagnetic energy beam in a manner that not only provides the requisite stiffness and strength for the plurality of lenses, but does so in a manner that may be lighter so as to thereby improve the overall thrust-to-weight ratio of the engine.

With reference now to FIG. 8, a method of manufacturing an optical heat exchanger 12 that is carried by a vehicle 10, such as a rocket, a UAV or the like, is described. In this regard, the method defines a plurality of tapered openings 16 with a support structure 14 that is carried by the vehicle 10. See block 40 of FIG. 8. Each tapered opening 16 tapers from a first size proximate an outwardly facing end 18 of the opening to a second size, smaller than the first size, proximate an inwardly facing end 20 of the opening. The inwardly facing end 18 of each tapered opening 16 is in communication with a propellant 28 carried by the vehicle 10. The method of this embodiment also positions a plurality of lenses 22 proximate outwardly facing ends 18 of respective tapered openings 16. See block 42 of FIG. 8. Each lens 22 is configured to receive an electromagnetic energy beam 24 and to concentrate a majority of the electromagnetic energy beam through the inwardly facing end 20 of the respective tapered opening 16 so as to heat the propellant 28. In one embodiment, the plurality of lenses 22 are positioned so as to abut one another.

In one embodiment, the method also includes positioning an absorber surface 26 in communication with the inwardly facing end 20 of each tapered opening 16. In this regard, the absorber surface 26 may also be positioned so as to be in contact with the propellant 28. The absorber surface 26 is configured to absorb at least a portion of the electromagnetic energy beam 24. As such, the energy conveyed by the electromagnetic energy beam 24 may be provided directly to the propellant 28 so as to heat the propellant or may be provided by the absorber surface 26 of this embodiment which is heated and, in turn, heats the propellant. As such, an optical heat exchanger 12 that is carried by a vehicle 10, such as a rocket, a UAV or the like, may be manufactured in such a manner that the resulting optical heat exchanger has a desirable thrust-to-weight ratio.

An optical heat exchanger 12 and an associated system and method are therefore provided according to example embodiments of the present disclosure in order to allow a vehicle 10, such as a UAV, a rocket or the like, to deliver more payload at a lower cost, such as by improving the thrust-to-weight ratio of the engine of the vehicle. In one embodiment, the optical heat exchanger 12 and the associated system and method may provide for energy, such as electromagnetic energy, to be transferred into the propellant which has a lower mass and a higher exhaust speed than many heat exchanger laser thrusters and/or windowed heat exchangers.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical heat exchanger for heating a propellant carried by a vehicle, the optical heat exchanger comprising:
   a support structure defining a plurality of tapered openings, wherein each tapered opening of the plurality of openings tapers from a first size proximate an outwardly facing end of the opening to a second size, smaller than the first size, proximate an inwardly facing end of the opening, and wherein the inwardly facing end of each tapered opening of the plurality of openings is in communication with the propellant; and
   a plurality of lenses, each lens of the plurality of lenses positioned proximate the outwardly facing end of a respective tapered opening, wherein each lens includes a tapered edge, wherein each lens is at least partially seated within the outwardly facing end of the respective tapered opening in such a manner as to also abut adjacent lenses along respective edges thereof such that the edge of each lens includes one portion disposed within the respective tapered opening and another portion that extends outside of the tapered opening so as to abut adjacent lenses, and wherein the edge of each lens and sidewalls of the respective tapered opening are tapered at a same angle,
   wherein each lens of the plurality of lenses is configured to receive an electromagnetic energy beam and to focus the electromagnetic energy beam through the inwardly facing end of the respective tapered opening
   such that the electromagnetic energy beam propagates through the respective tapered opening, after having been focused by the respective lens, so as to heat the propellant without contacting side surfaces of the support structure that define the respective tapered opening, the side surfaces extend between the outwardly facing end and the inwardly facing end of the respective tapered opening.

2. An optical heat exchanger according to claim 1 wherein each lens of the plurality of lenses has at least one dimension that is smaller than a width of the electromagnetic energy beam.

3. An optical heat exchanger according to claim 1 wherein the lenses comprise convex lenses having a focal length that causes the electromagnetic energy beam to be focused through the inwardly facing ends of the respective tapered openings.

4. An optical heat exchanger according to claim 1 wherein the plurality of lenses comprise rectangular lenses, and wherein the support structure defines a plurality of frusto-pyramidal openings.

5. An optical heat exchanger according to claim 1 further comprising an absorber surface in communication with the inwardly facing end of each tapered opening of the plurality of openings and configured to absorb at least a portion of the electromagnetic energy beam, wherein the absorber surface is also configured to be in contact with the propellant.

6. An optical heat exchanger according to claim 5 wherein the absorber surface defines a plurality of corrugations.

7. An optical heat exchanger according to claim 6 wherein the corrugations extend in or are parallel to a direction in which the propellant is configured to flow.

8. An optical heat exchanger according to claim 1 wherein the support structure comprises a plurality of double tapered structural elements which define a plurality of double tapered openings, each double tapered opening including an inwardly tapering portion and an outwardly tapering portion, wherein the inwardly tapering portion transitions to the outwardly tapering portion at a location at which the double tapered structural element has its smallest width.

9. An optical heat exchanger according to claim 1 further comprising a window plug positioned between the inwardly facing end of the opening and the propellant.

10. An optical heat exchanger according to claim 1 further comprising an interior lens positioned between the inwardly facing end of the opening and the propellant.

11. An optical heat exchanger according to claim 1 wherein the plurality of lenses comprise first and second lenses positioned proximate the outwardly facing ends of first and second tapered openings, respectively, wherein the first lens is configured to focus the electromagnetic energy beam along an axis defined by a center axis of the first lens, and wherein the second lens comprises an off-axis lens configured to focus the electromagnetic energy beam to a point offset from the center axis of the second lens in a direction toward the axis defined by the center axis of the first lens, and wherein the inwardly facing end of the second tapered opening with which the off-axis second lens is associated is off-axis relative to the outwardly facing end of the second tapered opening.

12. An optical heat exchanger according to claim 11 wherein the plurality of lenses further comprise a third lens positioned proximate the outwardly facing end of a third tapered opening which is located on an opposite side of the first tapered opening relative to the second tapered opening, wherein the third lens comprises an off-axis lens configured to focus the electromagnetic energy beam to a point offset from a center axis of the third lens in a direction toward the axis defined by the center axis of the first lens but different than the direction in which the second lens is configured to focus the electromagnetic energy beam, and wherein the inwardly facing end of the third tapered opening with which the off-axis third lens is associated is off-axis relative to the outwardly facing end of the third tapered opening.

13. An optical heat exchanger according to claim 1 wherein the support structure further comprises a reflective coating configured to reflect the electromagnetic energy beam.

14. An optical heat exchanger according to claim 1 wherein the support structure defines a duct extending therethrough at a location between adjacent tapered openings, wherein the duct is configured to permit coolant to pass therealong.

15. An optical heat exchanger according to claim 1 wherein the support structure is comprised of tungsten.

16. An optical heat exchanger according to claim 1 wherein the plurality of lenses are aligned along a linear axis of the vehicle.

* * * * *